United States Patent
Giles

(10) Patent No.: US 10,303,437 B2
(45) Date of Patent: May 28, 2019

(54) SYNCHRONIZING MULTI-THREADED SERVICING OF A SERVER EVENT BUFFER

(71) Applicant: CA, Inc., New York, NY (US)

(72) Inventor: Nicholas Robert Giles, Hessle (GB)

(73) Assignee: CA, Inc., New York, NY (US)

( * ) Notice: Subject to any disclaimer, the term of this patent is extended or adjusted under 35 U.S.C. 154(b) by 386 days.

(21) Appl. No.: 15/346,266

(22) Filed: Nov. 8, 2016

(65) Prior Publication Data

US 2018/0129470 A1 May 10, 2018

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 5/14* | (2006.01) |
| *G06F 9/30* | (2018.01) |
| *G06F 9/52* | (2006.01) |

(52) U.S. Cl.
CPC .............. *G06F 5/14* (2013.01); *G06F 9/3009* (2013.01); *G06F 9/526* (2013.01); *G06F 2205/126* (2013.01)

(58) Field of Classification Search
CPC ........................................................ G06F 5/14
USPC ........................................................ 719/318
See application file for complete search history.

(56) References Cited

U.S. PATENT DOCUMENTS

| | | | |
|---|---|---|---|
| 2007/0043531 A1* | 2/2007 | Kosche | G06F 11/3447 702/182 |
| 2008/0114889 A1* | 5/2008 | Deshpande | H04N 21/2343 709/231 |
| 2015/0201026 A1* | 7/2015 | Corbett | H04L 67/141 709/228 |
| 2018/0131639 A1* | 5/2018 | Siemens | H04L 1/1874 |

* cited by examiner

*Primary Examiner* — Timothy A Mudrick
(74) *Attorney, Agent, or Firm* — Sage Patent Group

(57) ABSTRACT

A thread executed by a server to service events received into a deferred event buffer through connections to client sockets on client terminals, acquires a buffer lock responsive to the buffer lock not being acquired by another thread, and increments a buffer iteration counter. The thread identifies buffer entry N as a next candidate entry, and determines if two preconditions are satisfied: 1) a connection lock of a connection X context structure associated with the buffer entry N is not acquired by another thread; and 2) a connection iteration counter of the connection X context is less than the buffer iteration counter. Responsive to both preconditions being satisfied, the thread acquires a connection lock of the connection X context structure, removes the buffer entry N, and releases the buffer lock. The connection lock is released responsive to completing execution of a callback function performing the buffer entry N.

20 Claims, 5 Drawing Sheets

SYNCHRONIZING MULTI-THREADED SERVICING OF A SERVER EVENT BUFFER

BACKGROUND

Various embodiments described herein relate to computer software, and in particular to systems and methods for servicing server event buffers such as a HTTP event server.

Is desirable for HTTP servers to efficiently process a high volume of events received through connections to client sockets, such as Internet web browsers, on client terminals. Connection-oriented HTTP servers handle parallel connections by allocating a different processing thread to each of the connections. Each thread is responsible for the complete process of executing and responding to all events received through a particular one of the connections.

In contrast, event-driven HTTP servers process data received, on a connection or data arriving into a buffer to be sent on a connection, by triggering a callback function which services that data. These callback functions are all executed by a single thread. Consequently, as the number of connections increases, the resources of the server that are needed to handle such callback functions increases less rapidly. Furthermore, idle connections may consume almost no resources, in contrast to a thread of the connection-oriented HTTP server allocated to handle a presently idle connection. Idle connections can commonly occur in HTTP/1.1 where keep-alive connections are a default. However, single threaded processing of events results in inefficient low bandwidth throughput on multi-core processors.

SUMMARY

Some embodiments provide methods by a server for executing a plurality of threads to service events received into a deferred event buffer through a plurality of connections to client sockets on client terminals. A first thread performs operations that include acquiring a buffer lock in a deferred event buffer context structure responsive to determining that the buffer lock is not acquired by another of the threads, and incrementing a buffer iteration counter in the deferred event buffer context structure. The operations further include identifying a buffer entry N in the deferred event buffer as a next candidate entry for execution, and determining if the following two preconditions of a first set are satisfied for the buffer entry N: 1) a connection lock of a connection X context structure associated with the buffer entry N is not acquired by another of the threads; and 2) a connection iteration counter of the connection X context is less than the buffer iteration counter of the deferred event buffer context structure. Responsive to determining that both preconditions of the first set are satisfied, the first thread acquires a connection lock of the connection X context structure. The first thread then removes the buffer entry N from the deferred event buffer, releases the buffer lock in the deferred event buffer context structure, and begins execution of a callback function to perform one or more actions associated with a deferred event in the buffer entry N. The first thread releases the connection lock of the connection X context structure responsive to completing execution of the callback function to perform the one or more actions associated with the event type defined by the deferred event in the buffer entry N.

Some other corresponding embodiments are directed to a computer program product that includes a non-transitory computer readable storage medium with computer readable program code embodied in the medium. The computer readable program code when executed by a server causes a plurality of threads to be executed by the server to service events received into a deferred event buffer through a plurality of connections to client sockets on client terminals. A first thread of the plurality of threads performs operations that include acquiring a buffer lock in a deferred event buffer context structure responsive to determining that the buffer lock is not acquired by another of the threads, and incrementing a buffer iteration counter in the deferred event buffer context structure. The operations further include identifying a buffer entry N in the deferred event buffer as a next candidate entry for execution, and determining if the following two preconditions of a first set are satisfied for the buffer entry N: 1) a connection lock of a connection X context structure associated with the buffer entry N is not acquired by another of the threads; and 2) a connection iteration counter of the connection X context is less than the buffer iteration counter of the deferred event buffer context structure. Responsive to determining that both preconditions of the first set are satisfied, the first thread acquires a connection lock of the connection X context structure. The first thread then removes the buffer entry N from the deferred event buffer, releases the buffer lock in the deferred event buffer context structure, and begins execution of a callback function to perform one or more actions associated with a deferred event in the buffer entry N. The first thread releases the connection lock of the connection X context structure responsive to completing execution of the callback function to perform the one or more actions associated with the event type defined by the deferred event in the buffer entry N.

It is noted that aspects described herein with respect to one embodiment may be incorporated in different embodiments although not specifically described relative thereto. That is, all embodiments and/or features of any embodiments can be combined in any way and/or combination. Moreover, other methods, computer program products, and/or servers according to embodiments will be or become apparent to one with skill in the art upon review of the following drawings and detailed description. It is intended that all such additional methods, computer program products, and/or servers be included within this description, be within the scope of the present disclosure, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Embodiments of the present disclosure are directed to operations by a server to efficiently service events received through numerous connections to client sockets on client terminals. Although various embodiments are disclosed in the context of an HTTP event server, these and other embodiments may be performed by other types of servers.

Figure 1:
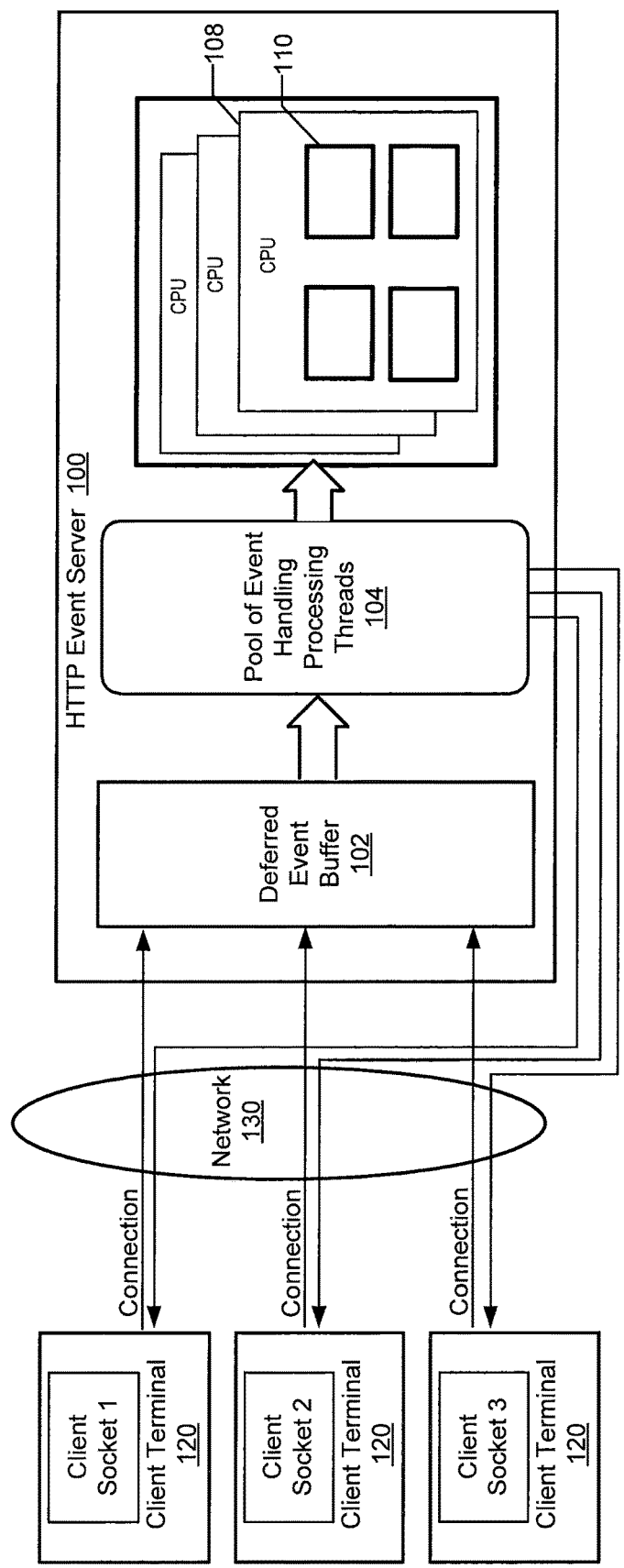
FIG. 1 is a block diagram depicting an HTTP event server that executes a pool of threads to service events received into a deferred event buffer through a plurality of connections to client sockets on client terminals, in accordance with some embodiments.

FIG. 1 is a block diagram depicting an HTTP event server 100 configured according to some embodiments. Referring to FIG. 1, the HTTP event server receives events through a plurality of connections, via one or more networks 130 (e.g., private networks and/or public networks, such as the Internet) to client sockets on client terminals 120. The events are stored in a deferred event buffer 102 while waiting for servicing. The server 100 executes a pool of event handling processing threads 104 to service the events in the deferred event buffer 102.

The server 100 decouples the processing of the events stored in the deferred event buffer 102 from execution of callback functions that perform one or more actions associated with those events. Each of the threads 104 can take events from the front of the deferred event buffer 102 to provide first-in first-out processing of the buffered events. For example, a read event triggered by a client socket making an HTTP request would cause a read event to be stored in the deferred event buffer 102 along with request data. If the HTTP request is complete, one of the threads 104 would then process the request data and output a responsive message through the connection toward the originating client socket on the client terminal 120. In contrast, if the HTTP request is not yet complete, the event is removed from the deferred event buffer 102 and the request data is buffered in a connection context awaiting completion of the HTTP request.

An event processing architecture of the HTTP event server 100 can include a set of processor chips (e.g., central processing units, or CPUs) 108 arranged on an appropriate electronics hardware platform (not shown) for executing computational and I/O instructions. Each CPU 108 may include a plurality of processing cores 110. Each processing core 110 may, for example, have its own floating point unit and instruction pipeline. In accordance with some embodiments, each of the event handling processing threads 104 is assigned to be processed by a different one of the processing cores 110. Each of the threads 104 may thereby execute in parallel on different CPUs 108 and/or processing cores 110. For each of the threads 104, all or at least a majority of operations (actions) defined to process the thread may be locked to being performed by an assigned one of the processing cores 110 and/or an assigned one of the CPUs 108.

Although FIG. 1 illustrates three client terminals 120 and one client socket per client terminal 120, is to be understood that any number of client terminals may be used and any number of client sockets per client terminal may be used with embodiments herein. Similarly, although a single deferred event buffer 102 and particular numbers of CPUs 108 and processing cores 110 have been shown for ease of illustration, it is to be understood that any number of such elements may be used with embodiments herein.

The threads 104 share responsibility for processing events in the deferred event buffer 102. It is therefore important to ensure that events are processed in their arrival order per connection into the deferred event buffer 102 in order to ensure data integrity for an event being processed.

One potential approach for ensuring data integrity is for each thread 104 to start at the head of the deferred event buffer 102 to identify a next candidate entry therein for execution. In order to ensure the correct order of execution of events per connection, only one of the threads 104 can process events for a particular connection. To ensure this, a lock is used for each connection, referred to as a connection lock. Before a thread can process one of the events in the buffer 102 for a particular connection, it must first acquire the connection lock for the particular connection. The connection lock is stored in one of the connection context structures 202 which is associated with the particular connection to a particular one of the client sockets associated with the event. Each event in the deferred event buffer 102 is paired with a pointer to the event's particular connection context structure 202.

A thread 104 may begin by first acquiring a buffer lock for the deferred event buffer, which is stored in a deferred event buffer context structure. The thread only accesses the deferred event buffer 102 if it has successfully acquired the buffer lock. Next, the thread looks at the first buffer entry at the head of the deferred event buffer and attempts to acquire the connection lock for the connection associated with that buffer entry. If the thread successfully acquires the connection lock, then it can remove that buffer entry from the deferred event buffer 102, release the buffer lock, execute a callback function to perform one or more actions associated with the deferred event in that buffer entry, and then release the connection lock on completion of the one or more actions. In contrast, if the thread was not successful at acquiring the connection lock, it skips that buffer entry and moves to the next buffer entry in the deferred event buffer and repeats the process of trying to acquire a connection lock for the connection associated with that next buffer entry. The next buffer entry is skipped if the connection lock is not acquired in the process continues until another buffer entry is successfully removed or until the end of the deferred event buffer is reached. If the end of the deferred event buffer is reached, the thread waits on a condition variable which is triggered when a new event is added to the deferred event buffer.

A potential problem may arise with data integrity if another thread is able to remove and execute a lower buffer entry before the thread'executes a higher buffer entry, when both buffer entries are associated with the same connection. Thus, a buffer entry that is received through a particular connection after an earlier buffer entry may improperly be executed first, which is out of order with how the client socket on the client terminal 120 is expecting the two buffer entries to be executed by the HTTP event server 100.

Figure 2:
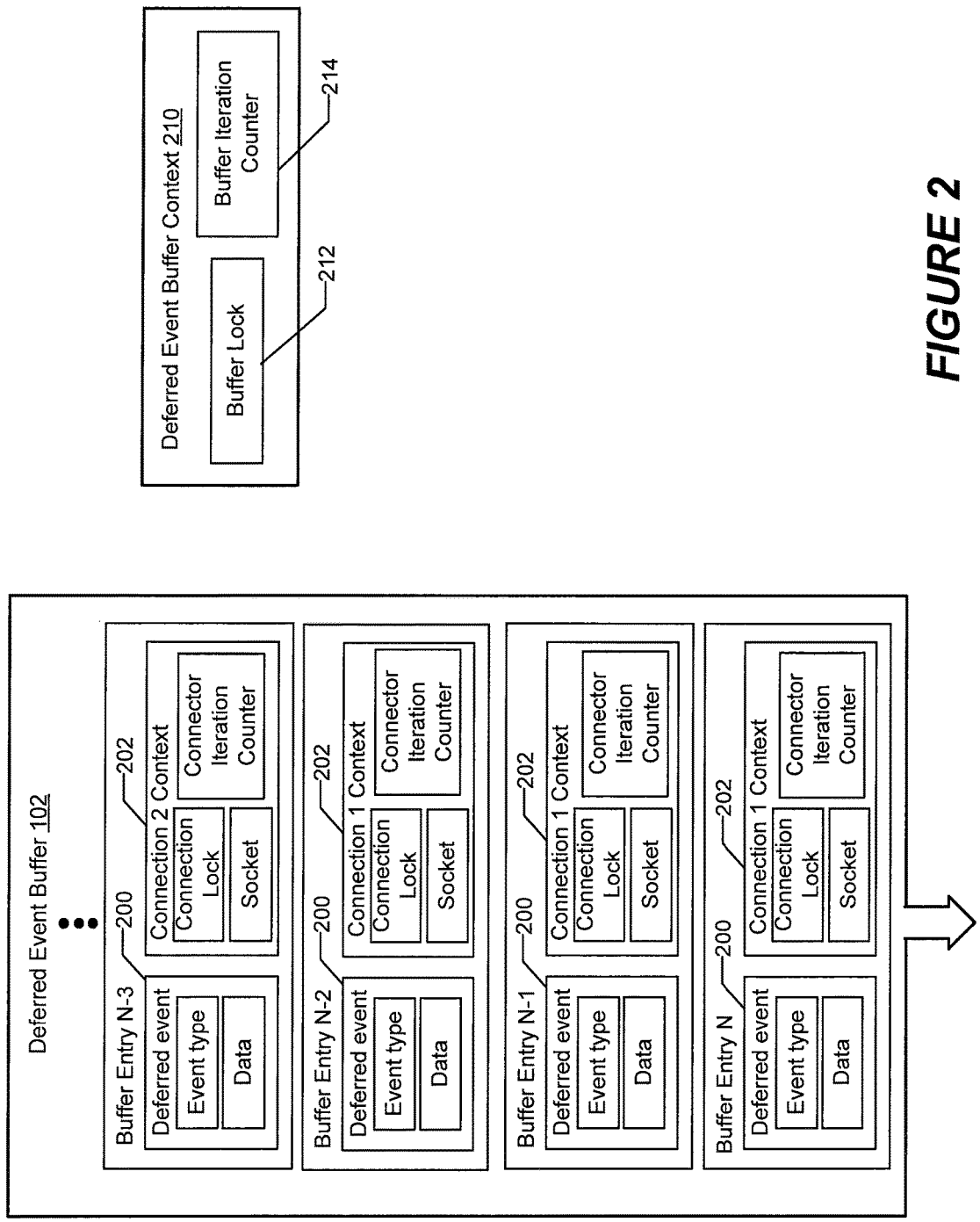
FIG. 2 is a block diagram depicting the deferred event buffer of FIG. 1 containing buffer entries each with a deferred event and a connection context structure, and containing a deferred event buffer context structure in accordance with some embodiments.

Various operations that may be performed by the HTTP event server 100 to ensure data integrity while processing events in the deferred event buffer 102 using a pool of event handling processing threads 100, are explained below in the context of FIGS. 2 and 3. FIG. 2 is a block diagram depicting the deferred event buffer 102 of FIG. 1 containing buffer entries (e.g., Buffer Entry N, Buffer Entry N-1, . . . ) each with a deferred event 200 and a connection context structure 202, and containing a deferred event buffer context structure 210 configured in accordance with some embodiments.

Referring to FIG. 2, a deferred event buffer context structure 210 (e.g., a data structure in a memory of the server 100) is programmatically associated with a buffer lock 212 and a buffer iteration counter 214. The deferred event buffer 102 includes a plurality of buffer entries, e.g., buffer entry N, buffer entry N-1, buffer entry N-2, buffer entry N-3, etc. Each buffer entry is programmatically associated with a connection context structure 202 (e.g., a data structure in a memory of the server 100) for a particular connection through which a deferred event 200 that was received. The deferred event 200 defines an event type having one or more actions associated therewith which are executed by the server 100 to service the deferred event 200. The deferred event may further include data that is to be operated upon by the one or more actions. The connection context structure 202 includes a connection lock, a connection iteration counter, and a socket that operates to communicate to the connection with the client socket on the client terminal 120. Only a single connection context structure 202 is used for each different connection.

As explained above, the connection context structure 202 is programmatically associated with a particular one of the connections through which the deferred event 200 of the same buffer entry was received. In the illustrated example of FIG. 2, buffer entry N is programmatically associated with a connection 1 context structure 202 which is associated with a Connection 1 to a client socket 1. Buffer entries N-1 and N-2 are also programmatically associated with the same connection 1 context structure 202 for the connection 1 to the client socket 1. In contrast, buffer entry N-3 is programmatically associated with a connection 2 context structure 202 which is associated with a Connection 2 to a client socket 2. Different connections are associated with different connection X context structures 202.

Figure 3:
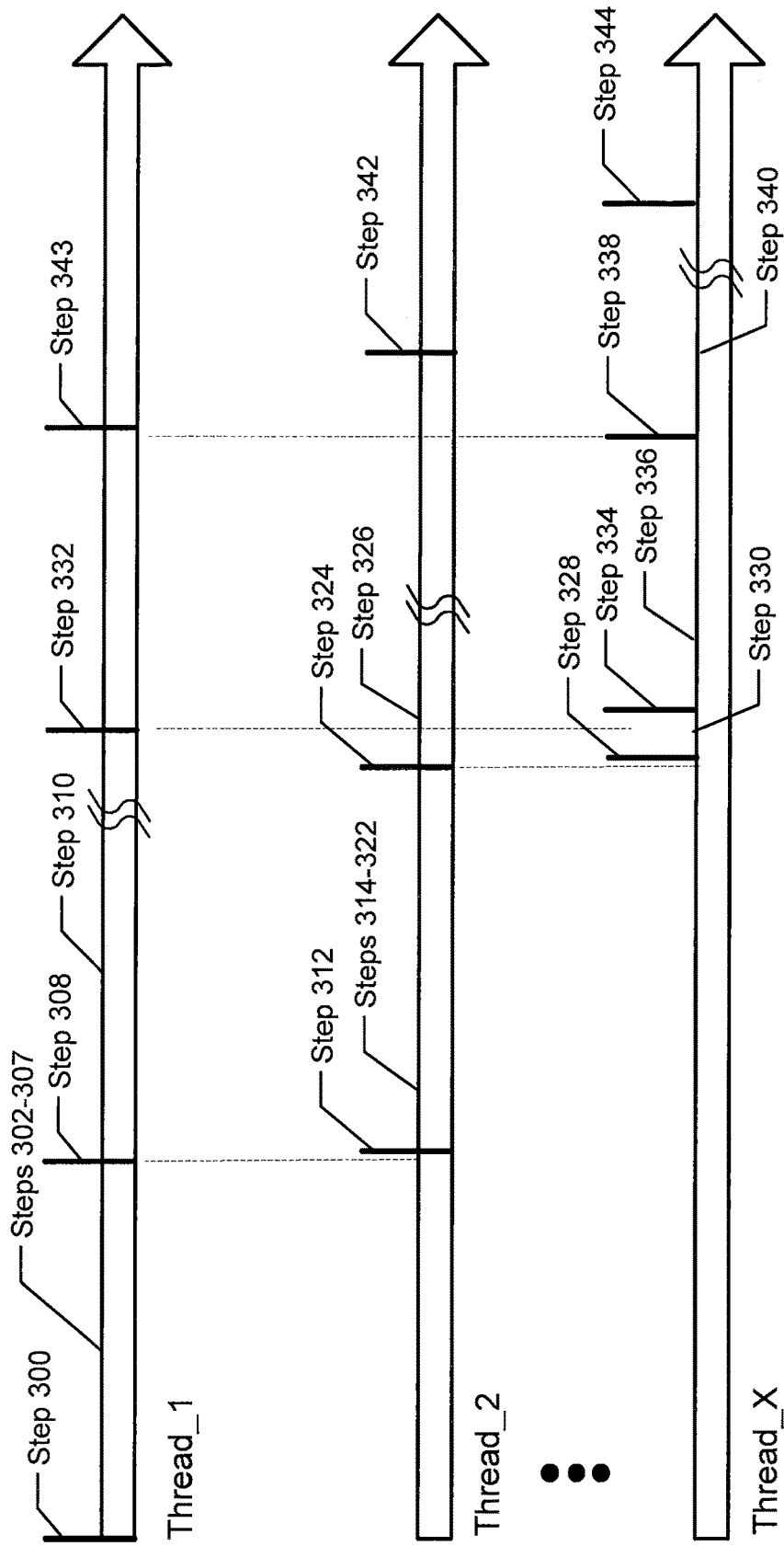
FIG. 3 illustrates a flowchart of operations performed by the pool of threads to service events received into the deferred event buffer of FIGS. 1 and 2 in accordance with some embodiments.
Figure 4:
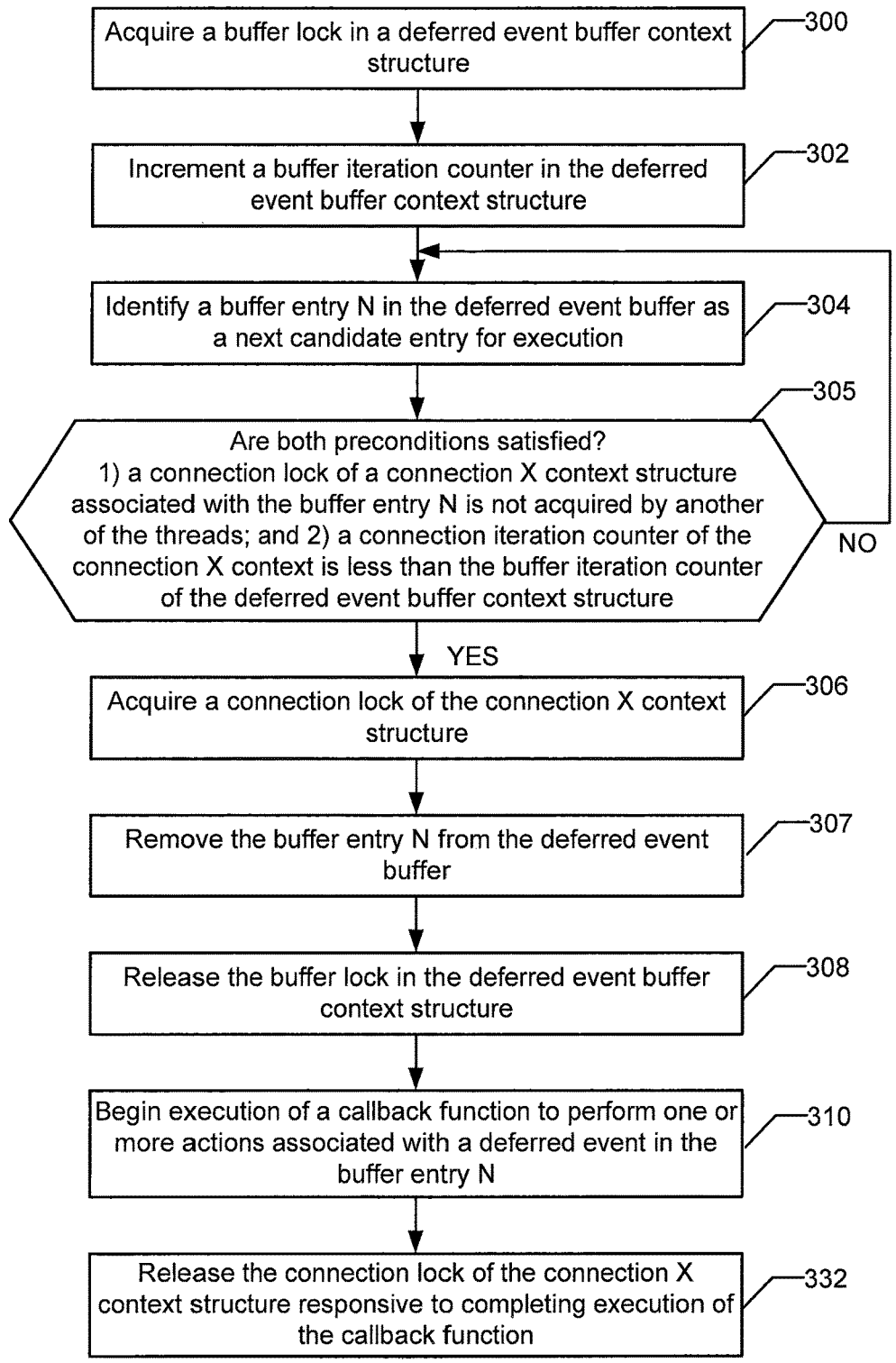
FIG. 4 illustrates a flowchart of further operations performed by one of the pool of threads to service events received into the deferred event buffer of FIG. 1 in accordance with some embodiments.

FIG. 3 illustrates a flowchart of operations performed by the pool of threads 104 to service events received into the deferred event buffer 102 of FIGS. 1 and 2 in accordance with some embodiments. FIG. 4 illustrates a flowchart of further operations performed by one of the pool of threads (e.g., Thread_1 in FIG. 3) to service events received into the deferred event buffer 102 of FIG. 1 in accordance with some embodiments. Referring to FIGS. 3 and 4, Thread_1 acquires 300 the Buffer Lock 212 in the Deferred Event Buffer Context structure 210 responsive to determining that the Buffer Lock 212 is not acquired by another thread. Thread_1 increments 302 a Buffer Iteration Counter in the Deferred Event Buffer Context structure.

Thread_1 identifies 304 a Buffer Entry N in the Deferred Event Buffer 102 as the next candidate entry for execution. Thread_1 determines 305 if the following two preconditions are satisfied: 1) a Connection Lock of a Connection 1 Context structure 202 associated with Buffer Entry N is not acquired by another thread, which in this example is determined to be satisfied; and 2) a Connection Iteration Counter of the Connection 1 Context structure 202 is less than the Buffer Iteration Counter 214 of the Deferred Event Buffer Context structure 210, which in this example is satisfied because the Connection Iteration Counter was set to an earlier value of the Buffer Iteration Counter 214. Responsive to determining 305 that both preconditions are satisfied, Thread_1 acquires the Connection Lock of the Connection 1 Context structure 202.

Thread_1 removes 307 the Buffer Entry N from the Deferred Event Buffer 102, and releases 308 the Buffer Lock in the Deferred Event Buffer Context structure 210. Thread_1 begins executing 310 a callback function to perform one or more actions associated with an event type and data defined by a deferred event in the Buffer Entry N. The actions performed by execution of the callback function may include outputting a message through the socket defined by the Connection 1 Context structure 202 toward the client socket on the client terminal 120 that originated the deferred event.

Following Thread_1 releasing the Buffer Lock 212 in the deferred event buffer context structure 210, another one of the pool of threads 104, Thread_2, acquires 312 the Buffer Lock in the Deferred Event Buffer Context structure 210 responsive to determining that the Buffer Lock 212 has become released. Thread_2 increments 314 the Buffer Iteration Counter 214 in the Deferred Event Buffer Context structure 210. Thread_2 identifies 316 Buffer Entry N-1 in the Deferred Event Buffer 102 as the next candidate entry for execution.

Before Thread_1 has released the Connection Lock of the Connection 1 Context structure 202, Thread_2 determines if the following two preconditions are satisfied: 1) the Connection Lock of Connection 1 Context structure is not acquired by another thread, but the Connection Lock is still acquired by Thread_1 while Thread_1 continues to process the Buffer Entry N; and 2) the Connection Iteration Counter of the Connection 1 Context structure 202 must be less than the Buffer Iteration Counter 214 of the Deferred Event Buffer Context structure 210, which is determined to be satisfied. Responsive to determining that the Connection Lock is acquired by another thread (i.e., Thread_1), Thread_2 sets the Connection Iteration Counter of the Connection 1 Context structure 202 equal to the Buffer Iteration Counter 214 of the Deferred Event Buffer Context structure 210. Furthermore, Thread_2 skips Buffer Entry N-1 responsive to determining that one of the preconditions (i.e., the first precondition) is not satisfied, i.e., because Thread_1 still has the Connection Lock of Connection 1 Context structure.

Following Thread_1 releasing the Connection Lock of Connection 1 Context structure, Thread_2 identifies 318 Buffer Entry N-2 in the Deferred Event Buffer 102 as the next candidate entry for execution, and determines if the following two preconditions are satisfied: 1) the Connection Lock of Connection 1 Context structure 202 is not acquired by another thread, which is determined to be satisfied because Thread_1 has now released it; and 2) the Connection Iteration Counter of the Connection 1 Context structure 202 is less than the Buffer Iteration Counter 214 of the Deferred Event Buffer Context structure 210, which is determined to be not satisfied. Thread_2 skips Buffer Entry N-2 responsive to determining that one of the preconditions (i.e., the second precondition) is not satisfied.

Thread_2 identifies 320 Buffer Entry N-3 in the Deferred Event Buffer 102 as the next candidate entry for execution, and determines if the following two preconditions are satisfied: 1) a Connection Lock of a Connection 2 Context structure 202 associated with Buffer Entry N-3 is not acquired by another thread, which in this example is assumed to be satisfied; and 2) a Connection Iteration Counter of the Connection 2 Context structure 202 is less than the Buffer Iteration Counter 214 of the Deferred Event Buffer Context structure 210, which in this example is satisfied because the Connection Iteration Counter was set to an earlier value of the Buffer Iteration Counter 214.

Responsive to determining that both preconditions are satisfied, Thread_2 acquires the Connection Lock of the Connection 2 Context structure 202, and removes 322 the Buffer Entry N–3 from the Deferred Event Buffer 102. Thread_2 releases 324 the Buffer Lock in the Deferred Event Buffer Context structure 202.

Following Thread_2 releasing 324 the Buffer Lock in the Deferred Event Buffer Context structure 202, Thread_3 begins executing 326 a callback function to perform one or more actions associated with an event type and data defined by a deferred event in the Buffer Entry N–3. The one or more actions may include outputting a message through the socket defined by the Connection 2 Context structure 202 toward the client socket on the client terminal 120 that originated the deferred event.

Thread_3 acquires 328 the Buffer Lock 212 in the Deferred Event Buffer Context structure 210 responsive to determining that the Buffer Lock 212 is not acquired by another thread. Thread_3 increments 330 the Buffer Iteration Counter 214 in the Deferred Event Buffer Context structure 210.

Thread_1 completes 332 execution of the callback function to process the Buffer Entry N and responsively releases the Connection Lock for Connection 1 Context structure 202. Thread_3 subsequently identifies 334 the Buffer Entry N–1 in the Deferred Event Buffer 102 as the next candidate entry for execution, and determines if the following two preconditions are satisfied: 1) the Connection Lock of the Connection 1 Context structure 202 is acquired by another thread, which in this example is determined to be satisfied since Thread_1 has now released it; and 2) the Connection Iteration Counter of the Connection 1 Context structure 202 is less than the Buffer Iteration Counter 214 of the Deferred Event Buffer Context structure 210, which in this example is satisfied because the Connection Iteration Counter was set to an earlier value of the Buffer Iteration Counter 214.

Responsive to determining that both preconditions are satisfied, Thread_3 acquires the Connection Lock of the Connection 1 Context structure 202. Thread_3 removes 336 the Buffer Entry N–1 from the Deferred Event Buffer 102. Thread_3 releases 338 the Buffer Lock 212 in the Deferred Event Buffer Context structure 210. Thread_3 begins executing 340 a callback function to perform one or more actions associated with an event type and data defined by a deferred event in the Buffer Entry N–1, where the actions may include outputting a message through the socket defined by the Connection 1 Context structure 202 toward the client socket of the client terminal 120 that originated the deferred event.

Following Thread_3 releasing 338 the Buffer Lock 212, Thread_1 or another available thread acquires 343 the Buffer Lock 212 and repeats the operational steps to process a next candidate entry in the Deferred Event Buffer 102 for execution, e.g., Buffer Entry N–2.

Thread_2 completes 342 execution of the callback function to process the Buffer Entry N–3 and responsively releases the Connection Lock for Connection 2 Context structure 202. Thread_3 completes execution 344 of the callback function to process the Buffer Entry N–1 and responsively releases the Connection Lock for Connection 1 Context structure 202.

Each of the threads 104 can be assigned to different processing cores 110 and/or to different CPUs 108 or execution. Operations performed by each of the threads 104 can thereby be performed in parallel to provide higher throughput processing of deferred events received from the client socket through the connections. Use of the connection specific context structures 202 and the deferred event buffer context 210, and more particularly, the connection specific lock and the buffer lock, enables data integrity to be maintained while parallel processing of the buffer entries in the deferred event buffer 102 is performed. Data integrity ensures that a correct order of execution of events per connection is maintained while the events are processed by the pool of event handling processing threads 104.

One or more other threads, which may reside in the pool of event handling processing threads 104 may handle receiving events through the connections to the client sockets and putting the events into the deferred event buffer 102. For example, Thread_4 can respond to receiving an event through one of the plurality of connections to the client sockets on the client terminals 120, by: 1) acquiring the Buffer Lock 212 in the deferred event buffer context structure 210 responsive to determining that the Buffer Lock 212 is not acquired by another of the threads; 2) adding a buffer entry containing the received event to the deferred event buffer 102; and 3) releasing the Buffer Lock 212 in the deferred event buffer context structure 210.

Figure 5:
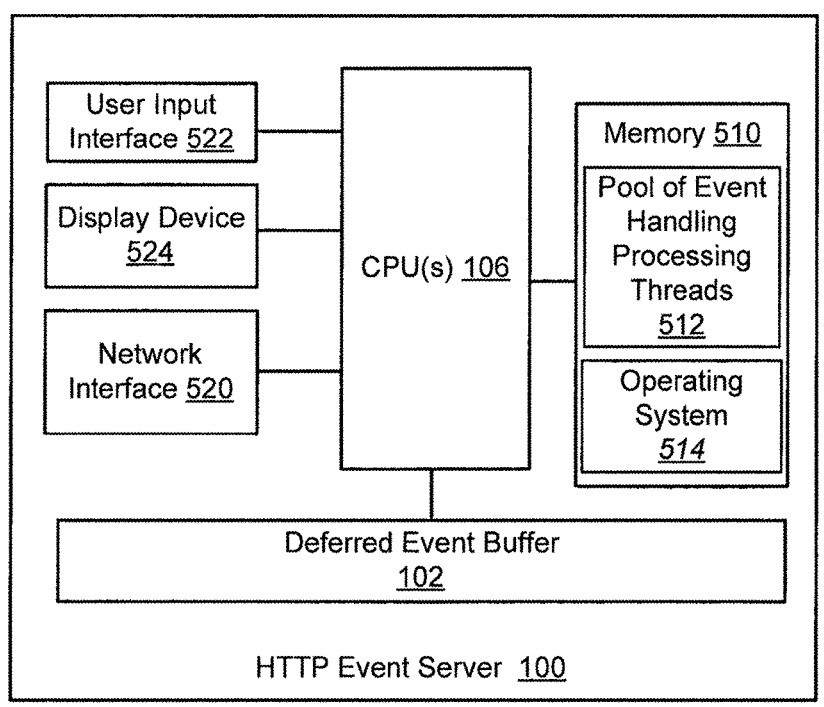
FIG. 5 is a block diagram of further details of the HTTP event server of FIG. 1 configured according to some embodiments.

FIG. 5 is a block diagram of an HTTP event server 100 configured according to some embodiments. Referring to FIG. 5, the HTTP event server 100 includes one or more CPUs 108, a memory 510, and a network interface 520 configured to communicate through the network 130 with the client terminals 120. The network interface 520 may include a radio access network transceiver and/or a wired network interface (e.g., Ethernet interface). The radio access network transceiver can include, but is not limited to, a LTE or other cellular transceiver, WLAN transceiver (IEEE 802.11), WiMax transceiver, or other radio communication transceiver.

The one or more CPUs 108 may each include a plurality of processing cores 110. The CPUs 108 may general purpose and/or special purpose processor (e.g., microprocessor and/or digital signal processor) that may be collocated or distributed across one or more networks. The one or more CPUs 108 is configured to execute computer program code in the memory 510, described below as a non-transitory computer readable medium, to perform at least some of the operations described herein as being performed by an access control computer. The computer program code when executed by the one or more CPUs 108 causes the one or more CPUs 108 to perform operations in accordance with one or more embodiments disclosed herein for the HTTP event server 100. The computer program code provides a pool of event processing threads 512 that are controlled by an operating system 514 to perform operations disclosed herein for threads that are configured to receive deferred events from client sockets through connections, the deferred events into the deferred event buffer 102, and to process the deferred events from the deferred event buffer 102. The HTTP event server 100 may further include a user input interface 522 (e.g., touch screen, keyboard, keypad, etc.) and a display device 524.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

The description herein has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:

for a first thread of a plurality of threads executed by a server to service events received into a deferred event buffer through a plurality of connections to client sockets on client terminals, performing operations as follows:

acquiring a buffer lock in a deferred event buffer context structure responsive to determining that the buffer lock is not acquired by another of the threads;

incrementing a buffer iteration counter in the deferred event buffer context structure;

identifying a buffer entry N in the deferred event buffer as a next candidate entry for execution, and determining if the following two preconditions of a first set are satisfied for the buffer entry N: 1) a connection lock of a connection X context structure associated with the buffer entry N is not acquired by another of the threads; and 2) a connection iteration counter of the connection X context is less than the buffer iteration counter of the deferred event buffer context structure;

responsive to determining that both preconditions of the first set are satisfied, acquiring a connection lock of the connection X context structure;

removing the buffer entry N from the deferred event buffer;

releasing the buffer lock in the deferred event buffer context structure;

beginning execution of a callback function to perform one or more actions associated with a deferred event in the buffer entry N; and releasing the connection lock of the connection X context structure responsive to completing execution of the callback function to perform the one or more actions associated with the event type defined by the deferred event in the buffer entry N.

2. The method of claim 1, wherein execution of the callback function to perform the one or more actions associated with the event type defined by the deferred event in the buffer entry N, comprises outputting a message through a socket defined by the connection X context structure toward a client socket on a client terminal.

3. The method of claim 1, for a second thread of the plurality of threads executed by the server to service the events received into the deferred event buffer, performing operations as follows:

following the first thread releasing the buffer lock in the deferred event buffer context structure, the second thread acquiring the buffer lock in the deferred event buffer context structure responsive to determining that the buffer lock is not acquired by another of the threads;

incrementing the buffer iteration counter in the deferred event buffer context structure;

before the first thread has released the connection lock of the connection X context structure, the second thread identifying a buffer entry N–1 in the deferred event buffer as a next candidate entry for execution, and determining if the following two preconditions of a second set are satisfied for the buffer entry N–1: 1) the connection lock of the connection X context structure associated with the buffer entry N–1 is not acquired by another of the threads; and 2) the connection iteration counter of the connection X context is less than the buffer iteration counter of the deferred event buffer context structure; and responsive to determining that the first precondition of the second set is not satisfied because the connection X context has not been released by the first thread, setting the connection iteration counter of the connection X context equal to the buffer iteration counter in the deferred event buffer structure and skipping execution of the buffer entry N–1.

4. The method of claim 3, further comprising:

assigning execution of the first thread and the second to different processing cores of the server.

5. The method of claim 3, for the second thread of the plurality of threads, performing operations as follows:

following the first thread releasing the connection lock of the connection X context structure, the second thread identifying a buffer entry N–2 in the deferred event buffer as a next candidate entry for execution, and determining if the following two preconditions of a third set are satisfied for the buffer entry N–2: 1) the connection lock of the connection X context structure associated with the buffer entry N–2 is not acquired by another of the threads; and 2) the connection iteration counter of the connection X context is less than the buffer iteration counter of the deferred event buffer context structure; and responsive to determining that the first precondition of the third set is satisfied but the second precondition of the third set is not satisfied because the connection iteration counter of the connection X context is equal to the buffer iteration counter of the deferred event buffer context structure, skipping execution of the buffer entry N–2.

6. The method of claim 5, for the second thread of the plurality of threads, performing operations as follows:

following the skipping of execution of the buffer entry N–2, identifying a buffer entry N–3 in the deferred event buffer as a next candidate entry for execution, and determining if the following two preconditions of a fourth set are satisfied for the buffer entry N–3: 1) the connection lock of the connection Y context structure associated with the buffer entry N–3 is not acquired by another of the threads; and 2) the connection iteration counter of the connection Y context is less than the buffer iteration counter of the deferred event buffer context structure; and responsive to determining that both preconditions of the fourth set are satisfied, acquiring a connection lock of the connection Y context structure;

removing the buffer entry N–3 from the deferred event buffer;

releasing the buffer lock in the deferred event buffer context structure;

beginning execution of a callback function to perform one or more actions associated with a deferred event in the buffer entry N−3; and releasing the connection lock of the connection Y context structure responsive to completing execution of the callback function to perform the one or more actions associated with the event type defined by the deferred event in the buffer entry N−3.

7. The method of claim 6, wherein execution of the callback function to perform the one or more actions associated with the event type defined by the deferred event in the buffer entry N−3, comprises outputting a message through a socket defined by the connection Y context structure toward a client socket on a client terminal.

8. The method of claim 6, for a third thread of the plurality of threads executed by the server to service the events received into the deferred event buffer, performing operations as follows:

following the second thread releasing the buffer lock in the deferred event buffer context structure, the third thread acquiring the buffer lock in the deferred event buffer context structure responsive to determining that the buffer lock is not acquired by another of the threads;

incrementing the buffer iteration counter in the deferred event buffer context structure;

following the first thread releasing the connection lock of the connection X context structure and following the second thread setting the connection iteration counter of the connection X context equal to the buffer iteration counter in the deferred event buffer structure, identifying the buffer entry N−1 in the deferred event buffer as a next candidate entry for execution, and determining if the following two preconditions of a fifth set are satisfied for the buffer entry N−1: 1) the connection lock of the connection X context structure associated with the buffer entry N−1 is not acquired by another of the threads; and 2) the connection iteration counter of the connection X context is less than the buffer iteration counter of the deferred event buffer context structure;

responsive to determining that both preconditions of the fifth set are satisfied, acquiring the connection lock of the connection X context structure;

removing the buffer entry N−1 from the deferred event buffer;

releasing the buffer lock in the deferred event buffer context structure;

beginning execution of a callback function to perform one or more actions associated with a deferred event in the buffer entry N−1; and releasing the connection lock of the connection X context structure responsive to completing execution of the callback function to perform the one or more actions associated with the event type defined by the deferred event in the buffer entry N−1.

9. The method of claim 8, further comprising:
assigning execution of each of the first, second, and third threads to different processing cores of the server.

10. The method of claim 1, for a fourth thread of the plurality of threads executed by the server, performing operations as follows:

responsive to receiving an event through one of the plurality of connections to the client sockets on the client terminals,
acquiring the buffer lock in the deferred event buffer context structure responsive to determining that the buffer lock is not acquired by another of the threads, adding a buffer entry to the deferred event buffer, and releasing the buffer lock in the deferred event buffer context structure.

11. A computer program product, comprising:
a non-transitory computer readable storage medium comprising computer readable program code embodied in the medium that when executed by a server causes a plurality of threads to be executed by the server to service events received into a deferred event buffer through a plurality of connections to client sockets on client terminals, a first thread of the plurality of threads performing operations as follows:

acquiring a buffer lock in a deferred event buffer context structure responsive to determining that the buffer lock is not acquired by another of the threads;

incrementing a buffer iteration counter in the deferred event buffer context structure;

identifying a buffer entry N in the deferred event buffer as a next candidate entry for execution, and determining if the following two preconditions of a first set are satisfied for the buffer entry N: 1) a connection lock of a connection X context structure associated with the buffer entry N is not acquired by another of the threads; and 2) a connection iteration counter of the connection X context is less than the buffer iteration counter of the deferred event buffer context structure;

responsive to determining that both preconditions of the first set are satisfied, acquiring a connection lock of the connection X context structure;

removing the buffer entry N from the deferred event buffer;

releasing the buffer lock in the deferred event buffer context structure;

beginning execution of a callback function to perform one or more actions associated with a deferred event in the buffer entry N; and releasing the connection lock of the connection X context structure responsive to completing execution of the callback function to perform the one or more actions associated with the event type defined by the deferred event in the buffer entry N.

12. The computer program product of claim 11, wherein execution of the callback function to perform the one or more actions associated with the event type defined by the deferred event in the buffer entry N, comprises outputting a message through a socket defined by the connection X context structure toward a client socket on a client terminal.

13. The computer program product of claim 11, the computer readable program code when executed by the server further causes a second thread of the plurality of threads to perform operations comprising:

following the first thread releasing the buffer lock in the deferred event buffer context structure, the second thread acquiring the buffer lock in the deferred event buffer context structure responsive to determining that the buffer lock is not acquired by another of the threads;

incrementing the buffer iteration counter in the deferred event buffer context structure;

before the first thread has released the connection lock of the connection X context structure, the second thread identifying a buffer entry N−1 in the deferred event buffer as a next candidate entry for execution, and determining if the following two preconditions of a second set are satisfied for the buffer entry N−1: 1) the connection lock of the connection X context structure associated with the buffer entry N−1 is not acquired by another of the threads; and 2) the connection iteration counter of the connection X context is less than the buffer iteration counter of the deferred event buffer context structure; and responsive to determining that the first precondition of the second set is not satisfied because the connection X context has not been released by the first thread, setting the connection iteration counter of the connection X context equal to the buffer iteration counter in the deferred event buffer structure and skipping execution of the buffer entry N−1.

14. The computer program product of claim 13, the computer readable program code when executed by the server further causing execution of the first thread and the second to be assigned to different processing cores of the server.

15. The computer program product of claim 13, the operations of the second thread of the plurality of threads further comprising:

following the first thread releasing the connection lock of the connection X context structure, the second thread identifying a buffer entry N−2 in the deferred event buffer as a next candidate entry for execution, and determining if the following two preconditions of a third set are satisfied for the buffer entry N−2: 1) the connection lock of the connection X context structure associated with the buffer entry N−2 is not acquired by another of the threads; and 2) the connection iteration counter of the connection X context is less than the buffer iteration counter of the deferred event buffer context structure; and responsive to determining that the first precondition of the third set is satisfied but the second precondition of the third set is not satisfied because the connection iteration counter of the connection X context is equal to the buffer iteration counter of the deferred event buffer context structure, skipping execution of the buffer entry N−2.

16. The computer program product of claim 15, the operations of the second thread of the plurality of threads further comprising:

following the skipping of execution of the buffer entry N−2, identifying a buffer entry N−3 in the deferred event buffer as a next candidate entry for execution, and determining if the following two preconditions of a fourth set are satisfied for the buffer entry N−3: 1) the connection lock of the connection Y context structure associated with the buffer entry N−3 is not acquired by another of the threads; and 2) the connection iteration counter of the connection Y context is less than the buffer iteration counter of the deferred event buffer context structure; and responsive to determining that both preconditions of the fourth set are satisfied, acquiring a connection lock of the connection Y context structure;

removing the buffer entry N−3 from the deferred event buffer;

releasing the buffer lock in the deferred event buffer context structure;

beginning execution of a callback function to perform one or more actions associated with a deferred event in the buffer entry N−3; and releasing the connection lock of the connection Y context structure responsive to completing execution of the callback function to perform the one or more actions associated with the event type defined by the deferred event in the buffer entry N−3.

17. The computer program product of claim 16, wherein execution of the callback function to perform the one or more actions associated with the event type defined by the deferred event in the buffer entry N−3, comprises outputting a message through a socket defined by the connection Y context structure toward a client socket on a client terminal.

18. The computer program product of claim 16, the computer readable program code when executed by the server further causes a third thread of the plurality of threads to perform operations comprising:

following the second thread releasing the buffer lock in the deferred event buffer context structure, the third thread acquiring the buffer lock in the deferred event buffer context structure responsive to determining that the buffer lock is not acquired by another of the threads;

incrementing the buffer iteration counter in the deferred event buffer context structure;

following the first thread releasing the connection lock of the connection X context structure and following the second thread setting the connection iteration counter of the connection X context equal to the buffer iteration counter in the deferred event buffer structure, identifying the buffer entry N−1 in the deferred event buffer as a next candidate entry for execution, and determining if the following two preconditions of a fifth set are satisfied for the buffer entry N−1: 1) the connection lock of the connection X context structure associated with the buffer entry N−1 is not acquired by another of the threads; and 2) the connection iteration counter of the connection X context is less than the buffer iteration counter of the deferred event buffer context structure;

responsive to determining that both preconditions of the fifth set are satisfied, acquiring the connection lock of the connection X context structure;

removing the buffer entry N−1 from the deferred event buffer;

releasing the buffer lock in the deferred event buffer context structure;

beginning execution of a callback function to perform one or more actions associated with a deferred event in the buffer entry N−1; and releasing the connection lock of the connection X context structure responsive to completing execution of the callback function to perform the one or more actions associated with the event type defined by the deferred event in the buffer entry N−1.

19. The computer program product of claim 18, the computer readable program code when executed by the server further causing execution of each of the first, second, and third threads to be assigned to different processing cores of the server.

20. The computer program product of claim 11, the computer readable program code when executed by the server further causes a fourth thread of the plurality of threads to perform operations comprising:

responsive to receiving an event through one of the plurality of connections to the client sockets on the client terminals,
acquiring the buffer lock in the deferred event buffer context structure responsive to determining that the buffer lock is not acquired by another of the threads, adding a buffer entry to the deferred event buffer, and releasing the buffer lock in the deferred event buffer context structure.

* * * * *